United States Patent [19]

Wolf

[11] Patent Number: 4,848,522
[45] Date of Patent: Jul. 18, 1989

[54] SAFETY DEVICE TO PREVENT ACCIDENTAL UNWINDING OF A ROLLING SHUTTER OR ROLLING OVERHEAD DOOR WOUND ON A SHAFT

[75] Inventor: Rudolf Wolf, Coesfeld, Fed. Rep. of Germany

[73] Assignee: Josef Timmer GmbH, Coesfeld

[21] Appl. No.: 127,901

[22] Filed: Dec. 2, 1987

[51] Int. Cl.$^4$ .............................................. F16D 67/02
[52] U.S. Cl. ................................ 188/71.2; 160/296; 160/298; 182/234; 188/83; 188/118; 188/185; 192/103 B; 192/105 BB; 242/75.47; 242/107.3; 242/156.2
[58] Field of Search ............... 188/71.2, 83, 110, 185; 242/75.47, 107.3, 156, 156.2; 160/296, 298, 299; 192/103 B, 105 BA, 105 BB; 182/234

[56] References Cited

U.S. PATENT DOCUMENTS

| | | | |
|---|---|---|---|
| Re. 26,542 | 3/1969 | Popper | 188/185 |
| 650,325 | 5/1900 | Hugh | 188/185 |
| 2,175,382 | 10/1939 | Eason | 188/712 X |
| 2,375,909 | 5/1945 | Fawick | 192/105 BA |
| 3,966,024 | 6/1976 | Baer | 188/71.2 |
| 4,216,848 | 8/1980 | Shimodaira | 188/71.2 |

FOREIGN PATENT DOCUMENTS 36766 10/1971 Japan .................................. 188/185

Primary Examiner—George E. A. Halvosa
Attorney, Agent, or Firm—Felfe & Lynch

[57] ABSTRACT

A safety device for preventing accidental unrolling of a rolling shutter or overhead door comprising a cogwheel which has uniformly distributed on the circumference opening outward for containing radially movable tumblers, a cage which surrounds the cogwheel that contains an abutment in the form of a recess for the tumblers which are raised by the action of centrifugal force. Upon reaching a predetermined rotational speed, the tumblers engage an abutment in the cage and the cage acting as a brake is then driven by the cogwheel and slowed down by friction.

5 Claims, 3 Drawing Sheets

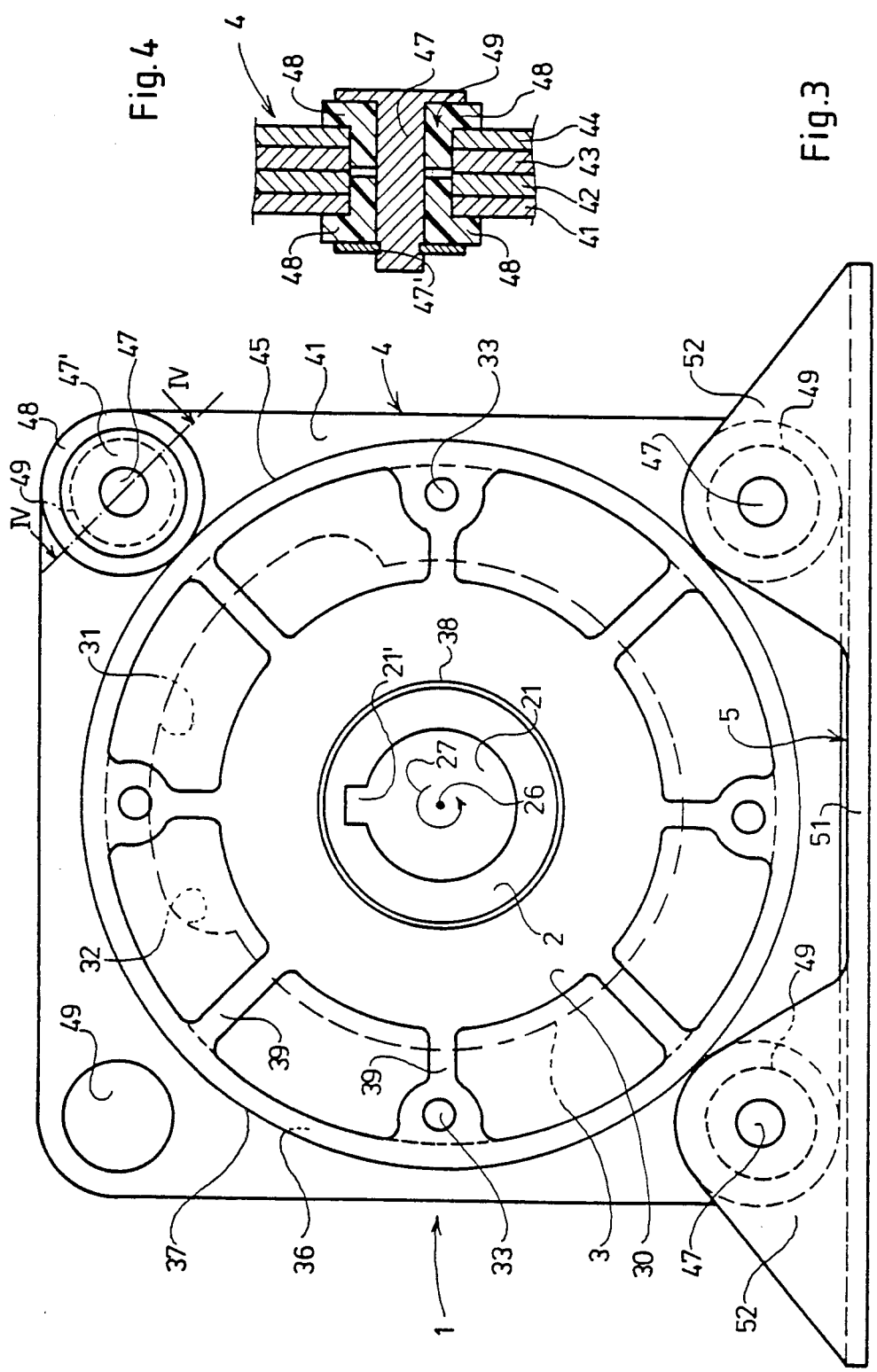

4,848,522

SAFETY DEVICE TO PREVENT ACCIDENTAL UNWINDING OF A ROLLING SHUTTER OR ROLLING OVERHEAD DOOR WOUND ON A SHAFT

BACKGROUND OF THE INVENTION

The invention relates to a safety device to prevent accidental unwinding of a rolling shutter or rolling overhead door that is wound on a shaft, having a cogwheel which is corotational with the winding shaft and has recesses uniformly distributed about the circumference for receiving radially movable tumblers, with a cage which surrounds the cogwheel and has an abutment in the form of a recess for engagement by the tumblers that are raised by centrifugal force, and with a fixedly disposed housing against which the cage can be turned with friction with the consumption of energy.

A safety device of the kind described is disclosed in German Patent No. 31 40 792. A disadvantage in this known device is that it is relatively expensive to manufacture. The cage has both on its inside and on its outside recesses which require special machining. Also the housing consists of three parts of which the middle part consists of a thick steel plate which has to be cut out in an expensive manner by means of a cutting torch and then finished. Lastly, it must be considered as a disadvantage that, with this apparatus, a severe collision of the cage against the housing can occur in the event of actuation, which can result in damage to the apparatus and/or to the shutter or door.

The problem therefore poses itself of creating a safety device of the kind described above, which will avoid the disadvantages mentioned and which especially can be manufactured more simply and thus less expensively, and which will assure a gentle but secure braking of the winding shaft in case of actuation.

SUMMARY OF THE INVENTION

The solution of this problem is accomplished according to the invention by a safety device of the kind described above, which is characterized by the fact that the cage is made with a smooth, continuous outer circumference, and that the cage is formed of two halves clamped together and disposed in planes perpendicular to the axis of rotation of the cogwheel which have confronting circular surfaces which act as brakes against a compatible circular portion of the fixed housing which acts as a brake disk.

On account of the smooth-surfaced configuration of the outer circumference of the cage the latter is easier to manufacture. Accordingly, the inside of the housing can also be smooth-surfaced, which likewise permits simpler manufacture. Since the cage is divided into two halves which act as brakes clamping between them a housing part serving as a brake disk, the apparatus requires but relatively few parts. This also simplifies the assembly of the device. At the same time the friction surface between cage and housing is relatively great, so that in case of actuation a very reliable braking of the winding shaft is assured without a severe terminal shock.

To make possible a precise adjustment of the braking force of the device, provision is made such that the two cage halves are joined together to produce their gripping action by a plurality of screws whose tightening torque is adjustable. The tightening of the screws can be performed, with a so-called "torque wrench," for example, to the degree necessary for a particular braking action. The apparatus can thus be easily adapted to rolling shutters or overhead rolling doors of different size and weight.

To eliminate the need for additional housing parts, provision is made for the two cage halves to be made as covers one for each face of the cogwheel. The cogwheel is thus concealed from the outside and protected against external influences such as moisture and dust.

To simplify the manufacture of the fixed housing, provision is made for it to be in the form of a packet of identical parts stamped from sheet steel. The stamped parts are quickly and easily manufactured and require no further working. These stampings are preferably joined together by bolts passing through them, each bolt surrounded by plastic liners. The bolts can serve simultaneously as means for fastening the housing to a building structure. By the use of the plastic liners a certain resilience is achieved which, in the case of an actuation of the safety device, reduces the stress on the connection between the housing and the building.

The cage halves are preferably die-castings, since they can also be manufactured simply and with sufficient accuracy. Also, in this manner a good coefficient of friction between the cage halves on the one hand and the housing on the other is assured.

BRIEF DESCRIPTION OF THE DRAWING

A preferred embodiment of the invention will be explained below in conjunction with a drawing. The figures of the drawing show.

DETAILED DESCRIPTION OF PREFERRED EMBODIMENT

Figure 1:
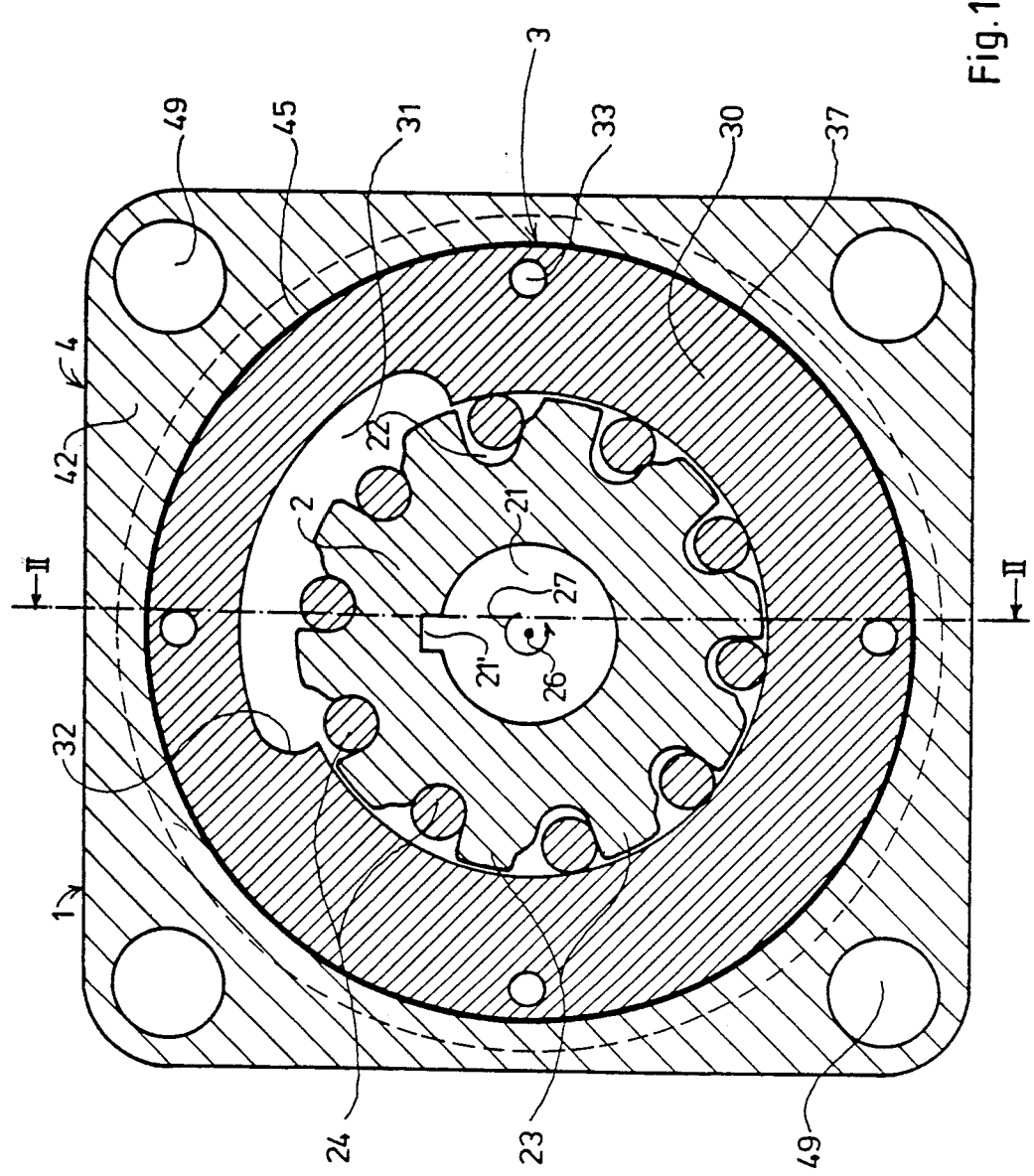
FIG. 1, the device in a cross section taken perpendicular to the axis of rotation of the cogwheel, FIG. 2, the device of FIG. 1 in a section taken along line II—II in FIG. 1, FIG. 3, a side view of the device, and FIG. 4, a detail in cross section along line IV—IV of FIG. 3.

As seen in FIG. 1, the embodiment of the safety device 1 represented in FIG. 1, as seen from the inside, consists of a cogwheel 2, a cage 3 surrounding it, and a fixed housing 4. In its center the cogwheel has a bore 21 for receiving a winding shaft, not shown, on which a roll shutter or a roll door can be wound. To produce a corotation between the cogwheel 2 and the winding shaft, the bore 21 has in its upper part a keyway 21' for a cotter. The cogwheel 2 has distributed over its outer circumference a number of recesses 22 each containing a tumbler 24 which is radially movable with respect to the cogwheel 2. The tumblers 24 are, in the embodiment represented, of cylindrical configuration; accordingly, the bottoms of the recesses 22 are of a semicircular shape. Between the individual recesses 22 of the cogwheel 2 are the outwardly projecting cogs 23 which together with the tumblers 24 provide for a braking of the winding shaft in case of actuation of the safety device. The operation of the device will be further explained below.

Most of the inside circumference of the cage 3 surrounding the cogwheel 2 is at a slight distance from the latter. In its upper portion the cage 3 has a recess 31 which in case of actuation forms an abutment for one of the tumblers 24.

The cage 3 consists of two halves which are disposed in planes perpendicular to the axis of rotation 26 of the cogwheel 2. In FIG. 1 only the front cage half 30 of the two cage halves is visible. These cage halves 30, as well as the other cage half which is not visible here, have bores 33 aligned with one another by which the two cage halves can be clamped together by means of bolts.

The outer part of the device 1 is formed by the fixed housing 4 which in the example represented is of substantially rectangular outline and whose inner margin is circular and surrounds the cage 3. At a discoidal portion 45 of the fixed housing 4, which is defined by the inner circumference of the housing 4 and the broken parallel line running parallel thereto, the cage 3, or more precisely its one half 30, lies under bias against the here-invisible back of the fixed housing 4. In like manner the other half of the cage 3 lies against the opposite side of the housing 4. Thus the housing 4 acts in its discoidal area 45 like a brake disk which is gripped between the two halves of the cage 3 acting as brakes.

The fixed housing 4 here consists of a plurality of parts stamped from sheet steel which are identical to one another and are laid one on the other to form the housing 4. The individual stampings, of which part 42 is visible in Figure 1, have through-bores or openings 49 in line with one another which serve to accommodate fastening means.

The housing 4 thus consists of a plurality of easy-to-make, identical parts. Since furthermore the outer circumference 37 of the cage 3 and the inner circumference of the housing 4 are of entirely smooth-surfaced configuration, the production of the device 1 is very simple.

The operation of the device 1 when it is actuated is as follows:

In the event of an uncontrolled roll-down of the shutter or door from the winding shaft, the latter will revolve with increasing speed. Accordingly the cogwheel 2, being corotational therewith, also rotates with increasing speed in the direction of the arrow 27. Upon the attainment of a certain rotatory speed the tumblers 24 are driven upward out of their recesses 22 by centrifugal force. Consequently, one of the tumblers 24 will become seized between one of the cogs 23 of the cogwheel 2 and the abutment 32 of the cage 3. The cage 3 will then be driven along by the cogwheel 2 until the energy of movement of the roll shutter or door is dissipated by the friction between the cage 3 and the fixed housing 4 and the winding shaft will come to a halt. The distances traveled by the roll shutter or door before it comes to a stop are determined by the strength of the grip between the two halves of the cage 3.

Figure 2:
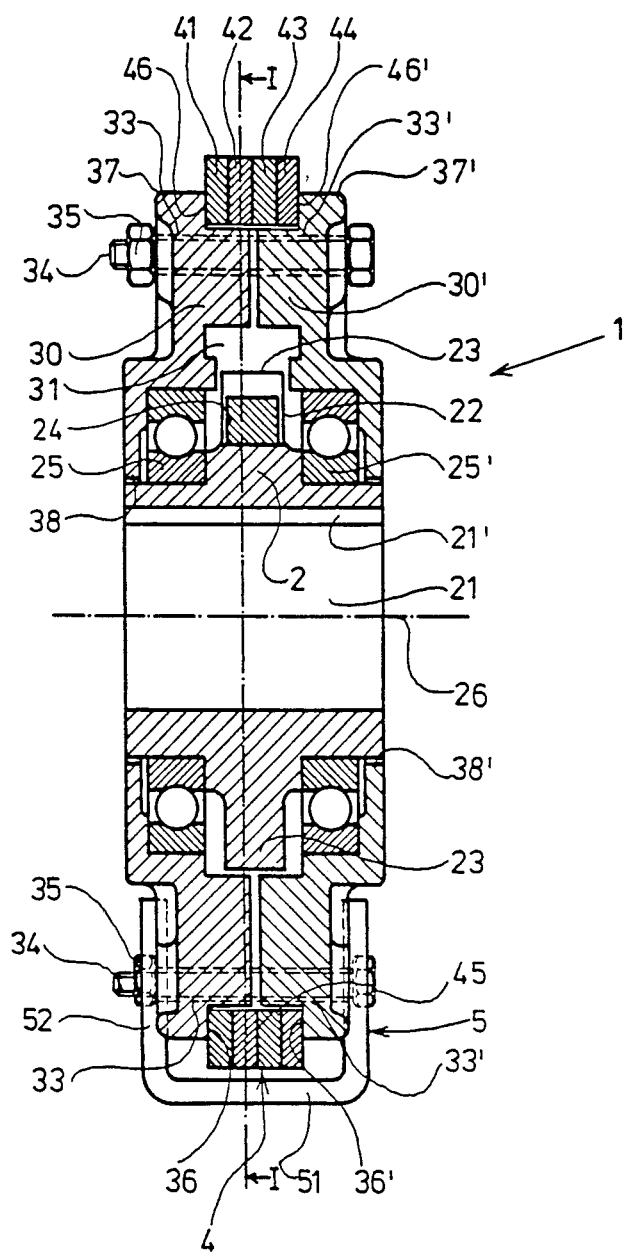

The way in which the two cage halves 30 and 30' are associated with one another and with the fixed housing 4 is especially visible in FIG. 2 of the drawing. As already explained, the housing 4 forms a circumferential ring which is composed of four stampings 41, 42, 43 and 44. The two cage halves 30 and 30' are symmetrical with one another and set at a small distance apart. On its outer part, each of the cage halves 30 and 30' has a circular surface 36 and 36', respectively, perpendicular to the axis of rotation 26 of the cogwheel 2. At these surfaces 36 and 36' the cage halves 30 and 30' are engaged with compatible surfaces 46 and 46', respectively, in the discoidal part 45 of the housing 4.

Also seen in FIG. 2 are two of the bores 33 and 33' passing through the cage halves 30 and 30'. In FIG. 2, bolts 34 are disposed in these bores, each provided with a nut 35. The nuts 35 are to be tightened onto the bolts 34 with greater or lesser torque according to the desired braking force. The pressure of the cage halves 30 and 30' against the housing 4 will depend on the tightening torque of the nuts 35 and bolts 34.

It can furthermore be seen in FIG. 2 that the cage halves 30 and 30' are simply smooth-surfaced on their outer circumference 37 and 37', respectively.

In the center of the device 1 represented in FIG. 2 can be seen the cogwheel 2 which can rotate about the axis 26. In its center is again the bore 21 with the keyway 21' for the purpose of accommodating the winding shaft and a cotter for the corotational coupling. With respect to the cage halves 30 and 30' the cogwheel 2 is journaled in two ball bearings 25 and 25'. The cage halves 30 add 30' are in the illustrated embodiment of device 1 such that they extend past the ball bearings 25 and 25' on both sides of the device 1 to the faces of the cogwheel 2. The cage halves 30 and 30' at the same time cover the cogwheel 2 and its tumblers 24 from the exterior, so that they are well protected against moisture or dust. The two cage halves 30 and 30' each have a central opening 38 and 38', respectively, to accommodate the winding shaft.

In the upper part of the cogwheel 2 one of the cogs 23 can be seen in a front view, the tumbler lying in front of this cog 23 being cut away. Lastly, in the bottom part of the cogwheel 2 can be seen another cog 23 in section.

The joining of the device 1 to a building is done in this embodiment by means of a base 5 in the form of a sturdy stamping made from steel plate. The base 5 consists essentially of a bottom plate 51 with flanges 52 bent up laterally therefrom for joining to the device 1, or more precisely to its housing 4.

The way the base 5 and housing 4 of device 1 are joined together is especially seen in FIG. 3. From the side view of the device 1 here represented it can be seen that the base 5 is joined at its flange 52 to the housing 4 by bolts 47 which are passed through the two lower openings 49. In the center of the device 1 can again be seen the bore 21 with the keyway 21' for the accommodation of the winding shaft. Around the bore 21 can be seen also a small portion of the cogwheel 2 which is rotatable about the axis 26. The rotational arrow 27 here again indicates the unrolling direction, which is counterclockwise.

The remaining part of the cogwheel 2 is concealed by the front half 30 of the cage 3 which here is visible. As FIG. 3 shows, the cage 3 and its front half 30 which is here visible has a circular external outline 37 underneath which is the confronting circular surface 36 for contact with the discoidal part 45 of the housing 4. A broken line indicates the inner circumference, facing the cogwheel 2, of the cage 3 with the recess 31 and the abutment 32 formed by the latter. In its center the cage half 30 again has the opening 38 for the accommodation of the winding shaft.

On the visible upper part of the cage half 30 are disposed a plurality of reinforcing ribs 39 within which the bores 33 for pressing the two cage halves 30 and 30' against one another are opposite one another.

In the upper right portion of FIG. 3 there is also shown how the two stampings forming the housing 4 are joined together, only the upper stamping 41 being here visible. The stampings to form the housing 4 are here joined together by a pin 47 which is passed through the opening 49 with the interposition of a plastic liner 48 and is secured in position by means of a retaining ring 47'.

The configuration of this fastening is represented in FIG. 4 in a cross section which is taken along the line IV—IV in FIG. 3. In the upper and lower part of FIG. 4 the stampings 41, 42, 43 and 44 can be seen, which form the housing, and which are provided with the aligned openings 49. The pin 47 is inserted into the openings 49 which are lined with a pair of plastic liners 48 and is fixed in its position with the retaining ring 47'. The plastic liners 48 lend a certain resilience to the junction between the individual stampings 41 to 44, and between the housing 4 and the base 5.

I claim:

1. A safety device for preventing accidental unrolling of a rolling shutter or rolling overhead door comprising:

a cogwheel which is joined for corotation with a winding shaft, said cogwheel possessing recesses opening outward and uniformly distributed on the circumference thereof, said recesses containing radially movable tumblers;

a cage which surrounds said cogwheel and which has an abutment in the form of a recess for said tumblers which upon attainment of predetermined rotational speed are raised by the action of centrifugal force; and a fixedly disposed housing in the form of a circumferential ring against which said cage can rotate with the consumption of energy by friction;

wherein said cage is made with a smooth-surfaced, continuous outer circumference and consists of two cage halves, said two cage halves being disposed in planes perpendicular to the axis of rotation of said cogwheel and having at least two symmetrical, circular surfaces facing each other and disposed substantially perpendicular to the axis of rotation of said cogwheel which, acting as brakes, engage a compatible discoidal portion of said fixed housing acting as a brake disk and said two cage halves being joined together by a plurality of bolts whose torque is adjustable for varying the pressure of said circular surfaces against said compatible discoidal portion of said fixed housing.

2. The device according to claim 1 wherein said two cage halves are configured as covering, one for each face of the cogwheel (2).

3. The device according to claim 2 wherein in said fixed housing is formed as a packet of identical stampings from sheet steel.

4. The device according to claim 3 wherein said stampings forming said housing are joined together by pins passing through them, each of which is surrounded by a plastic liner.

5. The device according to claim 3 characterized in that the cage halves comprise zinc alloy die castings.

* * * * *

UNITED STATES PATENT AND TRADEMARK OFFICE
CERTIFICATE OF CORRECTION

PATENT NO. :

DATED     :   4,848,522

INVENTOR(S) :   July 18, 1989

Rudolf Wolf

It is certified that error appears in the above-identified patent and that said Letters Patent is hereby corrected as shown below:

Column 4, line 16 for "30 add 30'" read

-- 30 and 30' --.

Column 6, line 19 for "covering" read

-- coverings --.

Column 6, line 28 for "3" read -- 2 --.

Signed and Sealed this

Twenty-eighth Day of August, 1990

Attest:

HARRY F. MANBECK, JR.

Attesting Officer

Commissioner of Patents and Trademarks